United States Patent [19]

Plaskett

[11] 4,125,634
[45] Nov. 14, 1978

[54] COAGULATION AND FLAVORING OF SPUN PROTEIN FIBERS

[75] Inventor: Lawrence G. Plaskett, High Wycombe, England

[73] Assignee: Biotechnical Processes Limited, London, England

[21] Appl. No.: 789,383

[22] Filed: Apr. 20, 1977

[30] Foreign Application Priority Data

Apr. 21, 1976 [GB] United Kingdom ............... 16084/76

[51] Int. Cl.² .............................................. A23J 3/00
[52] U.S. Cl. ................................... 426/231; 426/276; 426/802; 264/202
[58] Field of Search ............... 426/802, 276, 656, 657, 426/516, 517, 231; 264/202

[56] References Cited

U.S. PATENT DOCUMENTS

| | | | |
|---|---|---|---|
| 2,358,383 | 9/1944 | Tothes et al. ......................... | 264/202 |
| 2,398,625 | 4/1946 | Kadt ...................................... | 264/202 |
| 2,730,448 | 1/1956 | Boyer et al. ......................... | 426/802 X |
| 3,210,195 | 10/1965 | Kjelson et al. ...................... | 426/802 X |
| 3,269,841 | 8/1966 | Dechaine et al. ..................... | 426/656 |
| 3,863,016 | 1/1975 | Yamakami ............................. | 426/276 |
| 3,952,111 | 4/1976 | Desrosier ............................ | 426/802 X |

Primary Examiner—Kenneth M. Schor
Attorney, Agent, or Firm—Ladas, Parry, Von Gehr, Goldsmith & Deschamps

[57] ABSTRACT

A process is disclosed for the treatment of spun protein fibers which comprises carrying out one or more of the fiber coagulation, fiber stretching, fiber neutralizing or washing steps in a treatment bath fluid which contains as treating agents for the fibers, one or more of the following: a nitrogen-containing organic acid or salt or nitrogen-containing organic buffering agent, which may or may not be permitted to remain in the finished fibers, in a concentration effective to provide the principal buffering capacity in the treatment bath fluid.

34 Claims, 1 Drawing Figure

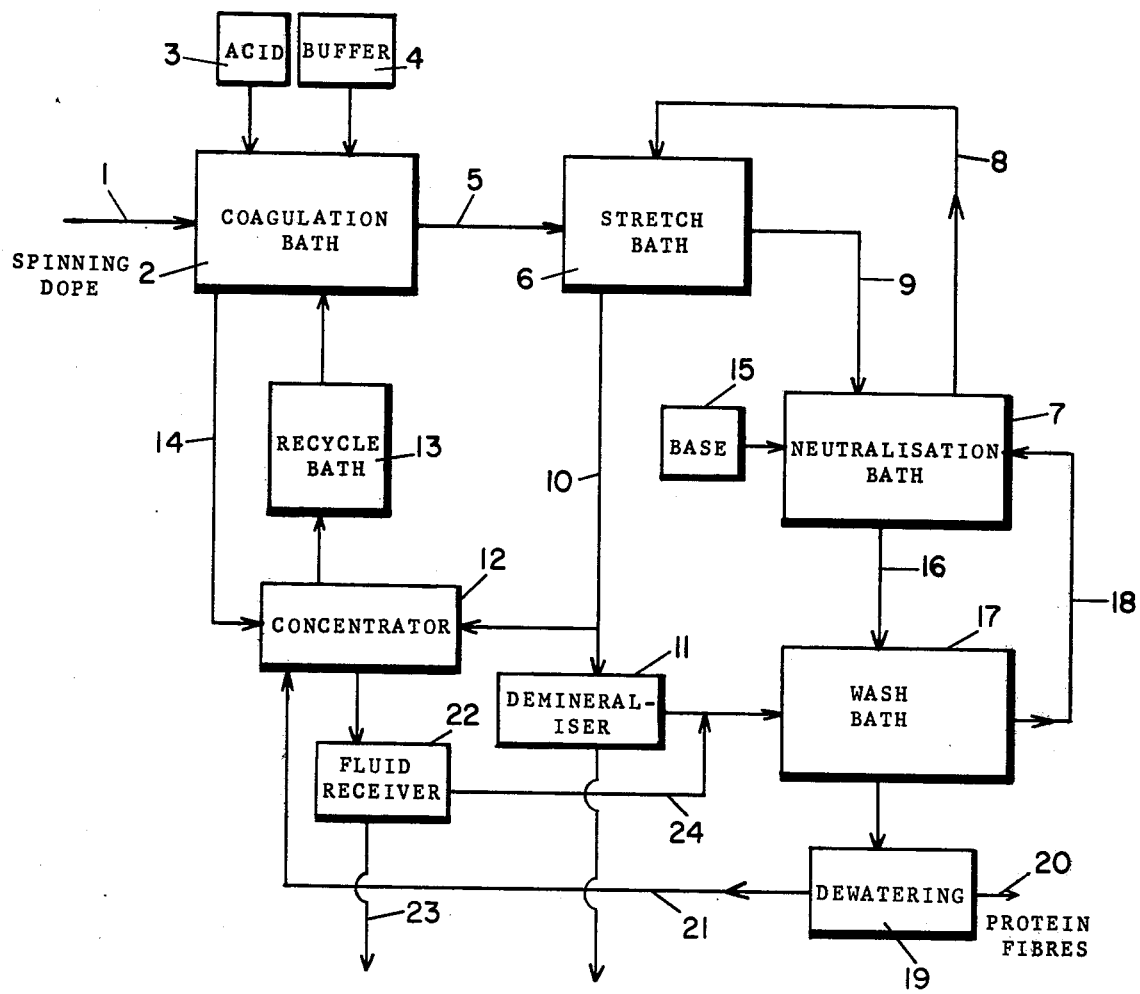

COAGULATION AND FLAVORING OF SPUN PROTEIN FIBERS

This invention relates to the production of protein products, especially meat analogs and cheese analogs, containing some or all of the protein in fibrous form obtained by the techniques known as spinning.

The process of spinning proteins is known in the art and generally comprises the steps of:
  (i) dissolving a protein or proteins in a solution of a suitable solubilizing agent, such as salts or alkali,
  (ii) passing the resulting protein solution through apertures in a spinnerette into a bath of medium in which the protein is coagulated into fibers, usually by acid but sometimes by thermal treatment,
  (iii) optionally, stretching the fibers in an appropriate medium such as an acid solution or salt solution,
  (iv) treating the fibers, in a manner which may vary greatly among users, to neutralize and/or wash out from the fibers the residual acid.

At step (iv) the fibers exist in a fairly stable condition (apart from microbial attack) and the process of fiber production may be regarded as complete. However, it is usual to pass the fibers through additional processing steps in order to convert them into meat and cheese analogs, in particular, treatment with fat, flavors and binding agents.

Finally, after treatment with one or more such agents, the fibers may be used as such, but are more commonly formed into a discrete shape, the shape being built up by placing layers of the fibers together by various means, e.g. by folding them upon themselves, by cutting and stacking them, or by rolling or winding them together with or without the application of pressure. The shaped proteins may then be set by heat.

The processes of folding, cutting, stacking, rolling or winding are referred to generically as "orientating" the fibers, and copending application Ser. No. 784,313, filed Apr. 4, 1977, inter alia, is concerned with a process for the preparation of a texturized protein composition which comprises orientating spun fibers in such a manner that in the finished product some fibers are set at angles to other fibers. Application Ser. No. 784,313 further discloses a layered protein composition comprising a minor amount of spun protein fibers arranged in discrete layers and a major amount of a protein-containing inter-fiber matrix.

It has now been found that protein compositions, such as those produced by the processes disclosed in application Ser. No. 784,313, may be further improved with respect to characteristics such as flavor retention, color and texture, by certain process steps provided by the present invention which is particularly concerned with a process which involves the impregnation of spun protein fibers with flavor and other desired additives during the formation thereof, preferably during coagulation, but also during subsequent process steps. Prior art processes, in which the spinning 'dope', i.e. the protein solution to be passed through the spinnerettes is an alkaline solution of protein, normally utilize a coagulation bath containing a solution of acid and salt, the pH of the bath fluid being adjusted to a value which ensures good fiber formation. The acids generally used are, for example, lactic, acetic or phosphoric acid or other non-toxic weak acid. Toxic acids are generally to be avoided on account of the danger that their subsequent removal from the fibers may be incomplete.

The use of a coagulation bath fluid having a composition comprising the said acids has several disadvantageous effects. One such effect is that since the protein solution entering the bath through the spinnerettes is alkaline (usually containing sodium hydroxide), salts of the weak acid or other acids present are formed which tend to alter the pH, ionic strength buffering capacity and salt content of the bath fluid. The parameters cannot be controlled adequately simply by the addition to the bath of supplementary chemicals and solutions; and consequently, even though the pH itself may be readily controlled, the bath solution must be replenished and/or replaced during the operation to avoid the build up of buffering salts, common salt (if HCl is used for pH control) and ionic strength.

This need to replenish and/or replace the coagulation bath fluid leads to high costs for the chemicals consumed in the coagulation step. Moreover, in prior art processes further baths of carefully selected composition are provided for the purposes of stretching, neutralizing and washing the fibers and the fluids in these baths also require replenishment and/or replacement causing a very high consumption of chemicals in the fiber manufacturing process takent as a whole.

Moreover, the use of large amounts of chemical substances, many of which are not incorporated in the finished fiber, leads to the generation of a large volume of effluent, containing both organic and inorganic solutes, which is unwanted and tends to be troublesome and expensive to dispose of. In the process of the present invention the diminution in the amount of chemicals used is accompanied by a very substantial reduction in the generation of waste solutes as well as major reduction in water consumption, as compared with prior art processes.

A further significant disadvantage of prior art processes has been that there was no economically viable way to add flavoring materials, coloring materials and other ingredients so that they would be incorporated into the fibers as they are formed and distributed through the fiber thickness. This has been the case because, for example, if flavoring agents were added to the alkaline spinning dope the low molecular-weight flavoring agents present (e.g. in protein hydrolysates, amino-acid compositions, compounded meat flavors, yeast extract, yeast autolysate, monosodium glutamate or nucleotide) would fail to be acid-coagulated along with the protein during fiber formation. While some flavoring may be retained in the fiber at first, the losses to the coagulation bath would be uneconomic. Moreover, flavorings remaining in the fibers immediately after coagulation would be leached from them during the subsequent steps of stretching, neutralizing and washing.

This disadvantage of being unable to incorporate flavorings, colorings, and other ingredients during fiber formation has been a very significant one. It has necessitated a separate flavor-incorporation step after fiber formation has been completed, which increases costs and, moreover, is not very effective. Flavoring materials must be used in high concentrations when effecting post-formation impregnation of fibers with flavor and uptake into the fiber is relatively slow on account of difficulty both in penetrating the fiber bundles with flavor solutes and in penetrating the individual fibers. Consequently, prior art processes tend to produce an effect whereby the exterior of protein fibers and protein fiber bundles are coated with flavoring but penetration into the fibers is poor. Moreover, the flavor of the finished product derived from such fibers is leached out quickly from it during chewing, leaving a flavorless material.

U.S. Pat. No. 2,730,448 to R. A. Boyer and H. E. Salwert discloses the addition to the precipitating (i.e. coagulation) bath of so-called modifying agents, including monosodium glutamate or protein hydrolysates in minor amounts so that they act merely as flavoring agents. In contrast to the disclosure in the said U.S. patent when nitrogen-containing organic compounds, such as protein hydrolysates, are employed in accordance with the process of the present invention they are used in concentrations sufficient to provide the principal buffering capacity in the treatment bath or baths and to replace wholly or to a substantial degree the weak organic acids and salts thereof which are employed in other prior art processes. As described hereinafter, the nitrogen-containing organic compounds which provide buffering capacity during coagulation preferably are allowed to remain in the finished fiber and the acidifying action of the organic acids used in prior art processes preferably is replaced either wholly or partially by mineral acid. None of these advantageous features is disclosed in U.S. Pat. No. 2,730,448.

The present invention provides in a process for the preparation of spun protein fibers comprising, in addition to spinning, the steps of coagulation, neutralizing and washing the protein fibers, the improvement which comprises carrying out one or more of the said processing steps of fiber coagulation, fiber neutralizing and washing the fiber free from excess acid or alkali, in a treatment bath fluid which contains, as treating agents for the fibers, one or more of the following: a nitrogen-containing organic acid, a nitrogen-containing organic acid salt or a nitrogen-containing organic buffering agent, in a concentration sufficient to provide the principal buffering capacity in the treatment bath fluid.

In carrying out the above process the treating agents may or may not be permitted to remain in the finished fibers, but preferably are permitted to remain in the finished fibers.

The above processing steps preferably may also include a stretching step and, when used, the stretching step also may be carried out in a treatment bath fluid containing one or more of the said treating agents.

Thus the process of the present invention involves the impregnation of spun protein fibers with one or more flavoring agents or other desired additives during coagulation and/or one or more of the subsequent processing steps.

The process of the present invention results in the production of edible spun protein fibers having flavoring materials, coloring materials and/or any other desired water-soluble additives or ingredients substantially uniformly distributed throughout the thickness of each fiber in such a manner that they are not so susceptible as prior art products to loss or leaching of the said materials during subsequent process operations or during chewing in the mouth.

In performing the process, the flavoring materials, coloring materials or other water-soluble additives which are to be incorporated in the finished fibers are present in a treatment bath liquid, for example in the coagulation bath during coagulation.

The present invention also provides a process for the preparation of spun protein fibers, which comprise passing the fibers emerging from the spinnerette through a coagulation bath comprising flavoring materials, coloring materials and/or water soluble ingredients having a buffering capability, particularly amino acids or peptide-containing mixtures, e.g. protein hydrolysates or preparations derived from yeast extracts or autolysates, with or without an acid normally employed in prior art processes to acidify the coagulation bath, e.g. acetic, lactic or phosphoric acid. In addition or as an alternative the said additives may also be present in one or more of the treatment baths subsequent to the coagulation bath.

Thus in the coagulation bath used in the process of the present invention the acids normally employed in prior art processes are replaced wholly or in part or are mixed with the said flavoring materials, coloring materials or water-soluble buffering materials.

The invention further provides a process in which the pH of the coagulation bath and subsequent treatment baths containing the said buffering substances is controlled during spinning by the addition of a mineral acid or by the addition of an acidic solution of the same or similar buffering substances. The source of acid for the coagulation step may be an un-neutralized acid hydrolysate of a protein, or an acidic solution of amino acids derived from an ion exchange separation process. Additionally the pH of one or more of the treatment bath fluids may be controlled by an autotitrator device.

The process of the present invention enables the coagulation step to be conducted in a manner whereby the need, which is normal in prior art processes, to rapidly replenish or replace the coagulation bath fluid with fresh fluid is greatly diminished or avoided. Also, the consumption of chemical material as process aids during coagulation and subsequent treatment of the fibers is greatly diminshed. Furthermore, the production of effluent waste materials, e.g. sodium acetate and sodium chloride that normally result from prior art processes, is greatly diminshed or avoided.

The invention will be more particularly described with reference to a preferred embodiments where the treating agents and additives are added to the coagulation bath but it is to be understood that similar results may be obtained when the materials are included in one or more of the subsequent treatment baths in accordance with the process of the invention.

In performing the process of the present invention flavoring materials and/or other ingredients which are to be incorporated in the finished fibers are dissolved or suspended in the coagulation bath fluid. At least some of the substances added to the coagulation bath fluid are substances having a significant buffering capacity at or close to the pH at which the fibers are coagulated. Thus, at least some of the ingredients are for example, amino acids or amides, salts or other derivatives of amino acids, including peptieds, polypeptides, or other nitrogenous compounds capable of existing in zwitterion form, or are organic acids having the appropriate ionisation characteristics and which are desired or tolerated in the finished fibers.

According to the present invention the pH of the coagulation both may be controlled by any means but preferably by automatic pH control (autotitration) using a strong mineral acid, such as hydrochloric acid, in aqueous solution. The use of hydrochloric acid alone has been attempted in the prior art but has been unsuccessful; apparently because the strength of the hydrochloric acid means that the pH necessary to coagulate protein fibers is reached at rather low HCl concentrations; hence, alkaline spinning 'dope' entering the bath solution through the spinnerette meets a solution of low buffering capacity and of low capacity for neutralizing and acidifying the protein solution. The local pH therefore tends to rise quite steeply around the spinnerettes and proper coagulation is not effected.

Suprisingly, it has now been fount that, provided the coagulation bath solution is adequately buffered, a mineral acid may be used as the acidifying agent. While it is known that mineral acid may be used to control the pH of a bath solution containing acetic acid or other weak acids, according to the present invention, the conventional acetic acid and other weak acids whose use for coagulation is common in the art, may be wholly or partly replaced by flavoring substances of the type described above and by other substances whose presence is desirable or tolerable in the finished fibers. Alternatively, according to the present invention, the flavoring substances and other ingredients desired in the end product fibers may be present in the coagulation bath in addition to prior art concentrations of weak acids. For example, protein hydrolysate and/or yeast extract may be added to the coagulation bath fluid in addition to prior art concentrations of acetic or lactic acid. In such cases it is preferred to use mineral acid at least in part to maintain the acidity of the coagulation bath.

In a particularly preferred embodiment of the present invention protein hydrolysate is included in the coagulation bath as a major component of the flavoring. Protein hydrolysate is particularly well suited for use in this invention because the typical protein hydrolysates currently in use in the food industry are principally composed of a mixture of (a) sodium chloride, (b) "flavor solids", of which amino acids represent an important component. According to the present invention the known requirements in the coagulation bath for common salt and also a buffering capacity both may be provided in whole or in part by the use of protein hydroysate, the flavor solids of the hydrolysate providing the buffering capacity. Preparations derived from yeast and compounded meat flavors also have this characteristic to differing extents depending upon their composition and they also may be used.

Amino acid and peptide preparations that are low in flavor contribution similarly may be used in the coagulation bath to contribute buffering capacity and to secure their incorporation into the fibers during fiber formation. This method may be used either to impregnate the fibers with particular amino acids that are essential to human nutrition (such as lysine or methionine) or to use in a beneficial way in human food products low cost non-protein nitrogen sources such as those derived as by-products from the processing of vegetables, such as sugar beet processing or potato starch manufacture, or derived as a by-product from leaf protein extraction.

A further advantage of the use of protein hydrolysate in the coagulation bath fluid arises from the manner in which protein hydroysate is normally manufactured so that it supplies at least a part of the acid needed to maintain acidification of the coagulation bath. Protein hydrolysate, as it is commonly used in the food industry, is manufactured by heating protein with a mineral acid such as hydrochloric acid. After the reaction is complete the mixture is still stronly acidic and it is normally neutralized with NaOH or $Na_2CO_3$. In accordance with the present invention, it is possible to provide both the flavoring and buffering agents required for the process and also the HCl needed to maintain bath acidity by employing as a raw material either (i) un-neutralized protein hydrolysate, or (ii) partly neutralized protein hydrolysate. In the case of un-neutralized protein hydrolysate, this makes no contribution to the NaCl content of the coagulation bath; hence the desired concentration of NaCl in the coagulation bath may be attained by an initial charge of NaCl into the coagulation bath at the start of the process and subsequently deriving NaCl from the interaction of HCl of the bath fluid with the NaOH of the spinning dope or by recovering and recycling NaCl from the various post-coagulation treatment baths as hereinafter described.

Thus the present invention enables the acid and alkali that are normally used and consumed in the manufacture of flavorsome protein hydrolysates to serve a dual purpose. The acid not only hydrolyses the protein but also acts subsequently as the acidification medium needed for the coagulation of protein fiber in spinning. The alkali, which would normally have been added to the acid hydrolysate at the end of the protein hydrolysis reaction is first used instead to dissolve the unhydrolysed protein which is spun into fibers, yielding the alkaline spinning 'dope' (or solution) which is required in the process. The interaction of the alkali with the acid is merely delayed, however, since this reaction, in accordance with the present invention, occurs in the coagulation bath.

The proportion of ingredients in the various fiber treatment baths used in the process of the present invention depends upon the exact operating conditions desired in each treatment bath, especially the coagulation bath.

It is important to prevent or substantially prevent the wastage of solutes from the coagulation bath fluid. Ideally, therefore, no fluid would be drawn off from the coagulation bath. In the process of the present invention there is no reason to run any of the coagulation bath fluid to waste, but action must be taken to avoid the accumulation of an excessive volume of bath fluid during the process. Water is introduced into the coagulation bath continuously in the form of spinning dope entering through the spnnerettes and in the form of acid solution and flavor solution. Water leaves the bath in the form of moisture in the protein fibers as they pass onwards to the stretch bath. Usually the nett result is that water enters the bath faster than it leaves unless corrective action is taken. Some coagulation bath fluid must be drained off to prevent this from happening. In a prefrred embodiment of the present invention the coagulation bath solution which is drained off is not wasted but may be wholly or partly demineralized if needed (as for example by electrodialysis or ion exchange), as a means of controlling the coagulation bath NaCl content at the desired level, and then concentrated (e.g. by evaporation) and returned to the bath to avoid wastage of flavor solids. The balance of flavor solids in the coagulation bath fluid is influenced by:
 (i) removal from the bath in the form of flavored fiber
 (ii) addition of fresh hydroysate or other flavoring agent;
 (iii) re-addition of re-cycled bath fluid concentrate; and so these three streams should be controlled so that a constant concentration of flavor solids is maintained in the fluid.

The balance of salt (NaCl) in the coagulation bath is influenced by:

(i) addition of salt;
(ii) addition of salt-containing flavoring materials such as a salt-containing hydrolysate.
(iii) the rate of entry of alkali in the form of spinning 'dope' which reacts in the bath with HCl;
(iv) the rate of removal of salt in the passing onwards to the stretch bath;
(v) treatment of recycled bath fluid to effect salt removal.

The adjustment of these process variables is dependent upon the NaOH content of the 'dope', the protein content of the 'dope', pumping rate of 'dope', the moisture content of the spun fiber, the salt content of the hydroysate employed and other factors controllable at will. Many sets of conditions exist whereby demineralization of coagulation bath fluid is not required.

The flow of materials in a preferred embodiment of the invention is illustrated in the accompanying drawing which is a schematic representation of a system showing the various baths and treatment stages in block form.

In the embodiment illustrated in the accompanying drawing a spinning dope containing protein dispersed in an aqueous sodium hydroxide solution is introduced through line 1 to a coagulation bath 2. Aqueous hydrochloric acid from a tank 3 and an aqueous solution or dispersion of buffering flavor solids from a tank 4 are also fed into the coagulation bath so that the bath fluid contains buffering flavor solids, sodium chloride and water and is maintained at an acidic pH, for example 2.9. Where reference is made herein to buffering flavor solids it is to be understood that buffering solids which are not flavor solids aslo may be used, as may flavor solids which are not buffering solids, so long as adequate buffering capacity is present in the coagulating bath or other baths. Excess bath fluid may be removed from the coagulation bath via line 14 and passed into a concentrator 12, whence it may be either recycled or drained away.

The resulting protein fibers containing buffering flavor solids, sodium chloride and water are passed via line 5 to a stretch bath 6. Bath fluid from a neutralization bath 7 is recycled to the stretch bath via line 8. The stretch bath 6 contains buffering flavor solids, sodium chloride and water and is normally at a higher pH than the coagulation bath, for example 5.0.

Excess bath fluid is removed from the stretch bath via line 10 whence some or all may be passed through concentrator 12 and recycle bath 13 to the coagulation bath 2, or some or all may be passed to demineralizer 11.

A suitable base, for example an aqueous sodium carbonate solution from tank 15, is added to the neutralization bath to raise the pH of the bath fluid, for example to a pH of 8.5. The neutralization bath 7, thus contains buffering flavor solids, sodium chloride and water at a pH of 8.5.

The resulting fibers, containing buffering flavor solids, sodium chloride and water and passed from the neutralization bath, via line 16, to a wash bath 17 which contains buffering flavor solids, a minor amount of salt, water and, optionally demineralized fluid from the demineralizer 11.

Some of the fluid from the wash bath 17 may be recycled to the neutralization bath 7 via line 18.

The protein fibers from the wash bath are passed through a fiber de-watering stage 19 when they emerge as moist protein fibers for further processing through line 20.

Excess fluid from the fiber de-watering stage 19 may be recycled through line 21 to the concentrator 12.

Water or condensed vapour removed by the concentrator 12 is passed to a receiver 22 whence it may be drained off through line 23 and the desired amount passed to the wash bath 17 via line 24.

It is preferred to maintain a reasonable concentration of flavor solids not only in the coagulation bath fluid but also in the fluids used in the stretch bath, neutralization bath and wash bath, the other ingredients in these various bath fluids being adjusted according to their function. In the simplest case, the concentration of flavor solids is the same throughout all the baths so that, after the fibers leave the coagulation bath there is no tendency for them to either gain or loose flavor solids during subsequent processing. However, it is possible to operate with a high concentration of flavor solids in the coagulation bath giving an initial concentration in the spun fibers higher than that needed in the finished product. In this case the fluids in the stretch bath, neutralization bath and wash bath, or at least some of these fluids, contian flavor solids at a lower concentration than in the coagulation bath, thus promoting diffusion of flavor solids out of the fibers. The benefit from this arrangement is that the residual flavor solids left in the fibers after such treatment are more firmly bound into the fibers, the less firmly attached flavor solids having been preferentially leached out. Therefore this represents a further means, in accordance with the present invention by which to improve the attachment or binding of the flavor into the protein fibers.

It is also within the scope of the present invention to omit flavor solids entirely from any or all of the stretch, neutralization and wash baths, although this results in a degree of leaching of flavor which is not normally desirable. It is possible, however, in accordance with the present invention to wash the fiber virtually free from hydrolysate (or other buffering flavor substances) taken up in the coagulation bath; in which case the hydrolysate (or other buffering flavor substances) functions simply as a process aid in fiber production.

The fluid of the stretch bath normally contains sodium chloride and, since it is often operated at elevated temperature, looses water by evaporation. Protein hydrolysate or other sodium chloride containing flavoring added to this bath fluid contributes to its desired salt content and the moist fibers leaving the bath to pass onward to the neutralization bath take some salt out with them. Acid and salt are continually brought into the bath from the coagulation bath by entrainment in the fibers pH control of this bath fluid at a valve between 3 and 9 is desirable and in practice usually involves the addition of some alkali solution since it is desirable to alter the pH of the fibers upwards at this stage towards that of the neutralization bath. In a preferred embodiment, as illustrated in the accompanying drawing, this is accomplished by passing 'spent' neutralization bath fluid into the stretch bath via line 8.

The neutralization bath in prior art processes usually contains a solution of a weak alkali. In the present invention the neutralization bath fluid is preferably a solution of flavor solids adjusted to a slightly alkaline pH. The incoming fibers are acidic and hence an input of alkali into the bath fluid is needed to maintain the desired pH; this may be accomplished, for example by adding either sodium hydroxide or sodium carbonate. Sodium carbonate has the advantage that gas bubbles formed between the fibers during neutralization may assist in separating them, improving the penetration of neutralizing fluid. The neutralizer reaction leads to an increase in salt in the fluid which requires control either by demineralization or by feeding fluid drawn off from the neutralization bath to one of the other treatment baths where a higher salt concentration is needed or tolerated (e.g. the stretch bath).

The wash bath fluid may be water or a solution of flavor soldis which may be largely demineralized if fibers of relatively low salt content are desired and which is at or close to the desired pH of the finished fibers. The fluid tends to accumulate salt washed from the fibers and should be controlled by demineralization or by drawing off bath fluid for transfer to another bath where salt is required (e.g. the neutralization and stretch baths).

A detailed process design and mass balance calculation is necessary for each individual version of the process which is to be put into use, the purpose being to optimise the use of inter-bath transfers of fluid, the use of concentration (e.g. by evaporation) of bath fluid and the use of demineralization so as to minimize consumption of alkali and virtually avoid altogether any losses of flavor solids.

In the event that a process in accordance with the present invention is used to secure incorporation into the finished fibers of ingredients or additives other than flavor solids and sodium chloride, it is usually desirable to include such additional ingredients or additives not only in the coagulation bath fluid but also at suitable concentrations in some or all of the bath fluids for subsequent treatments. Ingredients that may be added to the fibers in this way include non-acid-coagulable protein, minerals and vitamins that are nutritionally desirable; even when these are expensive they may be used without significant loss.

Similarly, in a process in accordance with the present invention, impurities that may be present in the protein of the spinning 'dope' need not be lost. In prior art processes a high proportion of such impurities fail to coagulate with the protein so that they go into solution in the coagulation bath fluid and are eventually lost in a process effluent. In a process in accordance with the present invention such impurities attain an equilibrium concentration in the various treatment baths and so are re-incorporated back into finished fibers. The nature of these non-protein substances varies according to the raw material being used but, since they are often nutritionally desirable substances, their retention constitutes a further significant advantage of the present process.

It is possible, in accordance with the present invention, if it should be desired to coat the fibers with a binding agent containing, for example, a solution of functional protein or a carbohydrate, to add such binding agent into one or more of the treatment bath fluids (such as the wash-bath fluid) as an alternative to coating with binding agent after washing in a separate operation. In this case the flow of the various solutions should be different from that shown in the accompanying drawing, since the bath fluid that contains the binding agent must then be kept separate from the other fluids.

Whereas the present invention is of greatest use and benefit in spinning systems that employ an alkaline spinning dope, the process of the present invention is also applicable to so-called 'mesophase' systems of spinning in which the protein solution to be passed throught the spinnerettes is a solution in which the protein is solubilized by salts. Inclusion of flavor and other ingredients into the coagulation bath provides, in mesophase systems just as in other systems, the desired inclusion of the added flavor and ingredients into the substance of the fibers.

The following Examples illustrate the invention and the manner in which it may be performed.

EXAMPLE 1

A spinning 'dope' was prepared by dissolving 1.59 Kg. soya protein isolate (PROMINE D) with 0.073 Kg. NaOH in water to give a final volume of 10 liters. This 'dope' was then passed through a spinnerette perforated by 6,000 holes of 75 microns diameter, using a pressure of approximately 60 pounds per square inch. Metering of the 'dope' was by means of a gear pump. The spinnerette was immersed in a bath of an aqueous solution which was 9.0% w/v with respect to the solids of an added maize gluten hydrolysate (NaCl being 44% of the total hydrolysate solids) and 1.64% w/v with respect to added salt, adjusted to pH 2.9 with 10% w/v HCl. The resulting protein fibers were continuously removed from the bath using driven rollers. They were then stretched (draw ratio 1:1.5) in a solution, pH 5.0, containing 3.57% w/v of the same maize gluten hydrolysate used in the coagulation bath and 1.36% w/v of added NaCl. Neutralization of the fibers was carried out in a bath of fluid containing 3.57% w/v of the maize gluten hydrolysate only, but adjusted to pH 8.5 by addition of $Na_2CO_3$. Washing of the fibers was conducted in this instance in a bath of tap water, the flavor solids and salt left behind in the washing water being set aside for concentration and re-use.

The fibers were well formed and contained hydrolysate solids as an integral ingredient. The hydrolysate flavor was not very readily removed from the fibers during chewing.

EXAMPLE 2

In a second preparation the preparation of the 'dope' and spinning were conducted exactly as described in Example 1. However, the coagulation bath contained maize gluten hydrolysate, (NaCl being 44% of the total hydrolysate solids) 6.0% w/v, yeast autolysate, (NaCl being 20% of the total autolysate solids) 2.0% w/v monosodium glutamate 0.5% w/v, added NaCl, 3.46% w/v adjusted to pH 2.9 with HCl. The stretch bath (draw ratio 1:1.5) contained the same maize gluten hydrolysate 2.0% w/v., yeast autolysate, 0.75% w/v, monosodium glutamate 0.25% w/v and NaCl, 1.2% w/v at pH 5.0. The neutralization and washing of the fibers was carried out in a solution of the same composition as that in the stretch bath but adjusted to pH 8.5 and 6.0 respectively, using $Na_2CO_3$.

The fibers were well formed and contained protein hydrolysate, yeast autolysate and monosodium glutamate as integral components.

The solutions used for stretching, neutralizing and washing increased in respect of their concenctrations of protein hydrolysate, yeast autolysate, monoodium glutamate and NaCl during the operation and for continuous production would have needed to be circulated and re-processed by a routine similar to that illustrated in the accompanying drawing.

I claim:

1. In a process for the preparation of spun protein fibers comprising, in addition to spinning, the steps of coagulation, neutralizing and washing the protein fibers free from excess acid and alkali, the improvement which comprises carrying out one or more of the said processing steps of fiber coagulation and fiber neutralizing in a treatment bath fluid which contains, as treating agents for the fibers, one or more of the following: a nitrogen-containing organic acid, a nitrogen-containing organic acid salt or a nitrogen-containing organic buffering agent, in a concentraion sufficient to provide the principal buffering capacity in the treatment bath fluid wherein the one or more treating agents are not completely washed out of the fibers and remain in the finished fibers.

2. A process according to claim 1 in which at least the coagulation bath fluid contains at least one of the said treating agents.

3. A process according to claim 1 in which one or more of the fluids in the said treatment baths contain one or more nitrogen-containing organic compounds having both acidic and basic ionisable chemical groupings together on the same molecule.

4. A process according to claim 3, in which at least the coagulation bath fluid contains one or more of the said treating agents.

5. A process according to claim 1, in which one or more of the fluids in the said treatment baths contains one or more of the following treatment agents: amino acid, amino acid derivative, peptide, polypeptide, or other nitrogenous compound capable of existing in zwitterion form.

6. A process according to claim 5 in which the said amino acid derivative is a salt or an amide.

7. A process according to claim 5, in which at least the coagulation bath fluid contains one or more of the said treating agents.

8. A process according to claim 1, in which one or more of the fluids in the said treatment baths, contains an organic buffering agent with a buffering capacity from pH 2.0 to pH 4.5.

9. A process according to claim 8, in which at least the coagulation bath fluid contains one or more of the said organic buffering agents.

10. A process according to claim 1, in which one or more of the fluids in the said treatment baths contains one or more treating agents selected from a hydrolysed protein, an autolysed protein and a compounded meat flavour derived from a protein hydrolysate.

11. A process according to claim 10, in which at least the coagulation bath fluid contains one or more of the said treating agents.

12. A process according to claim 9, in which the said treating agents remain in the finished fibers and impart flavor to the fibers.

13. A process according to claim 1, in which one or more of the fluids in the said treatment baths contains a crude amino acid-containing aqueous extract of animal or vegetable or microbial material.

14. A process according to claim 13, in which the said extract is derived from the same animal or vegetable material as some or all of the protein of the spinning "dope".

15. A process according to claim 13, in which the said extract is derived from yeast or from green leaves or from root vegetables or tubers.

16. A process according to claim 13, in which at least the coagulation bath contains the said extract.

17. A process according to claim 1, in which additionally flavoring agents, flavor enhancers, coloring agents, nutrients or other additives are included in the said treatment bath fluids and are incorporated in the finished fibers.

18. A process according to claim 1, in which flavoring agents, coloring agents, nutrients or other additives are included in the spinning dope.

19. A process according to claim 1, in which, once the fibers have been first contacted in one of the treatment baths with a particular treating agent or additive, suitable concentrations of the same agent or additive are maintained in the subsequent treatment baths to avoid loss of the agent or additive from the fibers.

20. A process according to claim 2, in which the desired concentration in the finished fibers of a particular treating agent or additive is achieved, at least in part, by maintaining a suitable concentration, above or below that in the coagulation bath, of the same treating agent or additive in subsequent treatment bath solutions.

21. A process according to claim 1, in which acetic acid, lactic acid or phosphoric acid is present in the coagulation bath fluid.

22. A process according to claim 1, in which the pH of each of the treatment bath fluids is controlled by the addition of mineral acid or inorganic alkaline compounds either directly into the treatment bath fluid or by mixing beforehand with other ingredients which are added to the treatment bath fluid.

23. A process according to claim 22, in which an un-neutralised hydrolysate prepared by heating protein with mineral acid is added to one or more of the treatment bath fluids.

24. A process according to claim 22, in which material added to the treatment bath is an acidic solution of nitrogen-containing organic compounds derived from an ion exchange process.

25. A process according to claim 1, in which the pH of one or more of the treatment bath fluids is controlled by an autotitrator device.

26. A process according to claim 1, in which the rate at which coagulation bath fluid is drained or pumped out of the coagulation bath during processing is limited to the minimum volume necessary to prevent the level of fluid in the bath from rising as acid, essential reagent and spinning dope are added to it.

27. A process acccoridng to claim 1, in which excess coagulation bath fluid is passed to a concentrator and recycled back into the coagulation bath.

28. A process according to claim 1, in which, in the post-coagulation stages of processing, treatment bath fluids are transferred between baths countercurrently with the movement of fiber.

29. A process according to claim 1, in which the bath fluid of the stretch bath is concentrated or demineralised and is re-used in the process.

30. A process according to claim 1, in which the protein fibers formed in the coagulation bath contain a higher concentration of a nitrogen-containing organic buffering agent than the finished fiber and in which a partial elution or leaching of the nitrogen-containing organic buffering agent is effected in the post-coagulation treatment baths.

31. A process according to claim 1, in which flavoring agents are present in the stretch bath and a draw ratio greater than 1.0 is employed.

32. A process according to claim 1, in which the neutralising of fibers and the rinsing from the fibers of excess alkaline neutralisation fluid is effected with the fiber in a tensionless condition and immersed beneath the surface of a treatment fluid.

33. A process according to claim 1, in which the processing steps include a stretching step.

34. A process according to claim 1, in which the processing steps include a stretching step which is carried out in a treatment bath fluid containing one or more of the said treating agents.

* * * * *